US008074503B2

(12) United States Patent
Tsutsumi et al.

(10) Patent No.: US 8,074,503 B2
(45) Date of Patent: Dec. 13, 2011

(54) FUEL PROPERTY SENSING DEVICE

(75) Inventors: Koji Tsutsumi, Anjo (JP); Xinyi Li, Nagoya (JP); Kensuke Tanaka, Hekinan (JP)

(73) Assignee: Denso Corporation, Kariya (JP)

( * ) Notice: Subject to any disclaimer, the term of this patent is extended or adjusted under 35 U.S.C. 154(b) by 126 days.

(21) Appl. No.: 12/621,885

(22) Filed: Nov. 19, 2009

(65) Prior Publication Data

US 2010/0122573 A1 May 20, 2010

(30) Foreign Application Priority Data

Nov. 19, 2008 (JP) ................................ 2008-295810

(51) Int. Cl.
*G01M 15/04* (2006.01)

(52) U.S. Cl. ................ 73/114.38; 73/114.54; 73/114.55

(58) Field of Classification Search ................. 73/35.02, 73/114.38, 114.53–114.55
See application file for complete search history.

(56) References Cited

U.S. PATENT DOCUMENTS

| | | | | | |
|---|---|---|---|---|---|
| 5,586,537 | A * | 12/1996 | Tomisawa et al. | | 123/435 |
| 5,732,681 | A * | 3/1998 | Ogita | | 123/492 |
| 5,817,923 | A * | 10/1998 | Ohsaki et al. | | 73/35.02 |
| 6,041,278 | A * | 3/2000 | Kennie et al. | | 701/103 |
| 6,318,152 | B1 * | 11/2001 | Hagihara et al. | | 73/35.02 |
| 7,401,591 | B2 * | 7/2008 | Yamaguchi et al. | | 123/299 |
| 7,421,884 | B2 * | 9/2008 | Aoyama | | 73/35.02 |
| 7,599,781 | B2 * | 10/2009 | Yamaguchi et al. | | 701/103 |
| 7,621,174 | B2 * | 11/2009 | Takaku | | 73/114.53 |
| 7,926,331 | B2 * | 4/2011 | Tsutsumi et al. | | 73/114.38 |
| 2007/0079647 | A1 | 4/2007 | Aoyama | | |
| 2008/0051978 | A1 | 2/2008 | Yamaguchi et al. | | |
| 2009/0198456 | A1 | 8/2009 | Tsutsumi et al. | | |

FOREIGN PATENT DOCUMENTS

| | | |
|---|---|---|
| JP | 9-112324 | 4/1997 |
| JP | 2004-340028 | 12/2004 |
| JP | 2006-226188 | 8/2006 |
| JP | 2008-208773 | 9/2008 |

OTHER PUBLICATIONS

Japanese Office Action dated Nov. 9, 2010, issued in corresponding Japanese Application No. 2008-295810, with English Translation.

* cited by examiner

*Primary Examiner* — Freddie Kirkland, III
(74) *Attorney, Agent, or Firm* — Nixon & Vanderhye P.C.

(57) ABSTRACT

A control unit executes sensing of a fuel property of fuel based on a physical value, which is related to a combustion state of the fuel in an internal combustion engine, when it is determined that a predetermined prerequisite operational condition for the sensing of the fuel property is satisfied upon occurrence of at least one of consumption of a predetermined amount of fuel, traveling of a vehicle through a predetermined travel distance, and execution of a predetermined number of operation cycle(s). The predetermined prerequisite operational condition may be satisfied when an operational state of the internal combustion engine is a deceleration fuel cut-off state or an idle state.

15 Claims, 11 Drawing Sheets

FIG. 10

| CETANE NUMBER BEFORE FUELING | CETANE NUMBER AFTER FUELING | POSSIBILITY OF ERRONEOUS SENSING |
|---|---|---|
| L | L | HIGH |
| | M | MEDIUM |
| | H | LOW |
| M | L | MEDIUM |
| | M | HIGH |
| | H | MEDIUM |
| H | L | LOW |
| | M | MEDIUM |
| | H | HIGH |

FIG. 12A
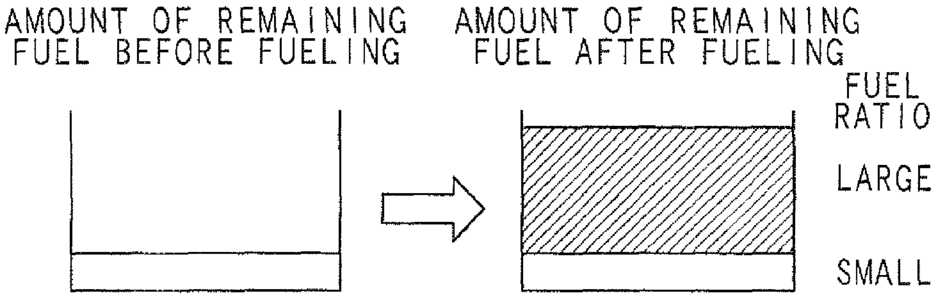
FIG. 12B
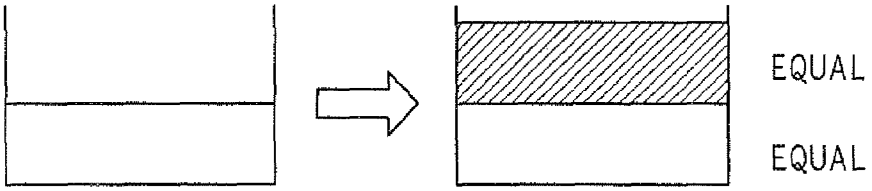
FIG. 12C
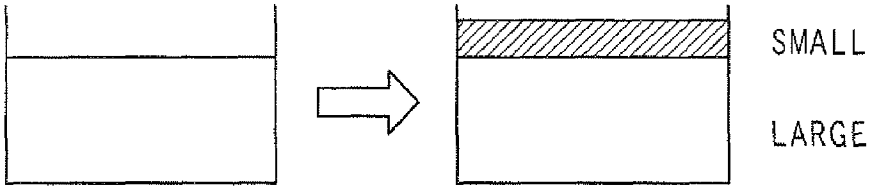
FIG. 12D
| AMOUNT OF FUEL | FUEL RATIO | POSSIBILITY OF ERRONEOUS SENSING |
|---|---|---|
| AMOUNT OF REMAINING FUEL BEFORE FUELING | SMALL | LOW |
| AMOUNT OF SUPPLIED FUEL | LARGE | |
| AMOUNT OF REMAINING FUEL BEFORE FUELING | EQUAL | HIGH |
| AMOUNT OF SUPPLIED FUEL | EQUAL | |
| AMOUNT OF REMAINING FUEL BEFORE FUELING | LARGE | LOW |
| AMOUNT OF SUPPLIED FUEL | SMALL | |

FUEL PROPERTY SENSING DEVICE

CROSS REFERENCE TO RELATED APPLICATION

This application is based on and incorporates herein by reference Japanese Patent Application No. 2008-295810 filed on Nov. 19, 2008.

BACKGROUND OF THE INVENTION

1. Field of the Invention

The present invent relates to a fuel property sensing device.

2. Description of Related Art

In an internal combustion engine, when a fuel property (e.g., a cetane number) of fuel supplied into a cylinder is changed, a combustion state of the fuel in the cylinder will be changed. Therefore, when the amount of fuel injected from a fuel injection valve or injection timing of the fuel injected from the fuel injection valve is controlled in conformity with the supplied fuel having a specific fuel property, it may possibly result in a decrease in an output torque of the internal combustion engine or an increase in noises generated from the internal combustion engine.

For example, in the case where the fuel injection is controlled in conformity with fuel having a particular cetane number, when another fuel, which has a cetane number higher than the particular cetane number of the previous fuel, is used, a combustion noise may be disadvantageously increased. Furthermore, when another fuel, which has a cetane number smaller than the particular cetane number of the previous fuel, is used, the output torque of the internal combustion engine may be disadvantageously reduced.

In view of the above disadvantages, it is known to sense the fuel property upon satisfaction of a predetermined prerequisite operational condition for sensing of the fuel property and then to control the fuel injection according to the fuel property. For example, according to Japanese Unexamined Patent Publication No. 2005-344557A (corresponding to US US2007/0079647A1), in a fuel cut-off state of the internal combustion engine, a fuel injection, which is dedicated to the sensing of the fuel property, is executed, and ignition timing for igniting this fuel is sensed to determine the fuel property.

Alternatively, according to Japanese Unexamined patent Publication No. 2008-75641A (corresponding to US 2008/0051978A1), a fuel property is sensed at the time of sensing the ignition timing in a predetermined operational state (e.g., an idle state) of the internal combustion engine, at which fuel injection is executed.

However, in the fuel cut-off state of the internal combustion engine, when the fuel injection, which is dedicated to the sensing of the fuel property, is executed every time the predetermined prerequisite operational condition is satisfied, the fuel consumption is disadvantageously deteriorated.

Also, when the predetermined prerequisite operational condition for the sensing of the fuel property is satisfied in the fuel cut-off state, external disturbances (e.g., load fluctuations), which are applied to the internal combustion engine, are small. Therefore, at this time, other prerequisite operational conditions for executing other control operations, which are other than the sensing of the fuel property, may be also satisfied. In the case where the fuel property is sensed every time the predetermined prerequisite operational condition is satisfied at the time of satisfying the other prerequisite operational conditions for executing the other control operations other than the sensing of the fuel property, the execution of the other control operations may possibly be interfered.

SUMMARY OF THE INVENTION

The present invention addresses the above disadvantages. According to the present invention, there may be provided a fuel property sensing device for an internal combustion engine, including a fuel property sensing means, a determining means and a commanding means. The fuel property sensing means is for sensing a fuel property of fuel based on a physical value, which is related to a combustion state of the fuel in the internal combustion engine. The determining means is for determining whether a predetermined prerequisite operational condition for the sensing of the fuel property with the fuel property sensing means is satisfied in the internal combustion engine. The commanding means is for commanding the sensing of the fuel property to the fuel property sensing means when the determining means determines that the predetermined prerequisite operational condition is satisfied upon each occurrence of consumption of a predetermined amount of fuel that serves as a parameter for determining a sensing frequency of the fuel property, which is sensed with the fuel property sensing means.

Alternative to or in addition to the function of the above commanding means, there may be provided a commanding means for commanding the sensing of the fuel property to the fuel property sensing means when the determining means determines that the predetermined prerequisite operational condition is satisfied upon each occurrence of traveling of a vehicle, which has the internal combustion engine, through a predetermined travel distance that serves as a parameter for determining a sensing frequency of the fuel property, which is sensed with the fuel property sensing means.

Also, alternative to or in addition to the function of the above commanding means, there may be provided a commanding means for commanding the sensing of the fuel property to the fuel property sensing means when the determining means determines that the predetermined prerequisite operational condition is satisfied upon each occurrence of execution of a predetermined number of operation cycle(s), each of which is from starting of the internal combustion engine to stopping of the internal combustion engine. The predetermined number of the operation cycle(s) serves as a parameter for determining a sensing frequency of the fuel property, which is sensed with the fuel property sensing means. Here, it should be noted that the predetermined number of the operation cycle(s) may be one or more.

BRIEF DESCRIPTION OF THE DRAWINGS

The invention, together with additional objectives, features and advantages thereof, will be best understood from the following description, the appended claims and the accompanying drawings in which:

FIG. 10 is a diagram for describing a possibility of erroneous sensing of the cetane number caused by a difference between the cetane number of fuel before the fueling and the cetane number of fuel after the fueling;

FIG. 12A to 12D are diagrams for describing a possibility of erroneous sensing of the cetane number caused by a difference between the amount of remaining fuel in the fuel tank before the fueling and the amount of remaining fuel in the fuel tank after the fueling.

DETAILED DESCRIPTION OF THE INVENTION

An embodiment of the present invention will be described with reference to the accompanying drawings.

Figure 1:
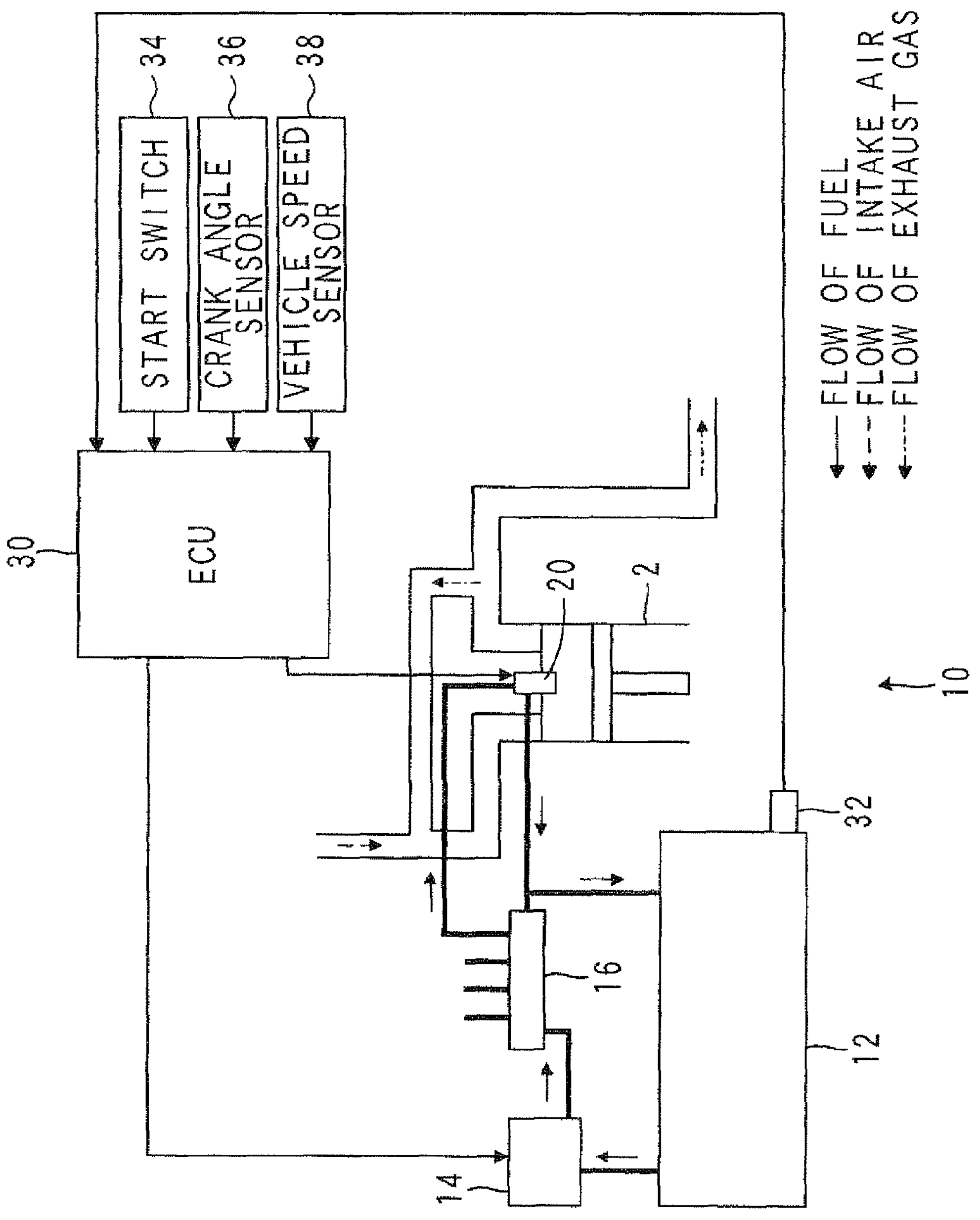
FIG. 1 is a block diagram showing a fuel injection system according to an embodiment of the present invention.

FIG. 1 shows a fuel injection system according to the embodiment of the present invention.

The fuel injection system 10 of the present embodiment supplies fuel to, for example, a four cylinder diesel engine (hereinafter, simply referred to as an engine) 2 of a vehicle. The fuel injection system 10 includes a fuel tank 12, a high pressure pump 14, a common rail 16, a plurality of fuel injection valves 20 and an electronic control unit (ECU) 30. The high pressure pump 14 pumps fuel from the fuel tank 12 to the common rail 16, and the common rail 16 accumulates the supplied high pressure fuel. The fuel injection valves 20 inject the high pressure fuel, which is supplied from the common rail 16, to cylinders of the engine 2. The ECU 30 controls the entire fuel injection system 10.

The high pressure pump 14 has a feed pump, which draws fuel from the fuel tank 12. The high pressure pump 14, which serves as a fuel supply pump, is of a known type, in which each plunger is reciprocally driven through rotation of a cam of a camshaft to draw fuel into a pressurizing chamber and then to pressurize the fuel drawn into the pressurizing chamber. The high pressure pump 14 has a metering valve (not shown) that adjusts a quantity of fuel, which is drawn from the feed pump in an intake stroke of the metering valve.

For example, each fuel injection valve 20 is of a known solenoid type that controls a lift amount of a nozzle needle, which is driven to open or close an injection hole, by adjusting a pressure of a control chamber.

The ECU 30, which serves as a fuel property sensing device, includes a microcomputer as its main component. The microcomputer has a central processing unit (CPU), a read only memory (ROM), a random access memory (RAM) and a flash memory. The ECU 30 receives signals from, for example, a pressure sensor (not shown), a fuel level sensor 32, a start switch (e.g., an ignition switch) 34, a crank angle sensor 36 and a vehicle speed sensor 38. The pressure sensor senses a fuel pressure (common rail pressure) in an interior of the common rail 16. The fuel level sensor 32 senses a fuel level in the fuel tank 12, i.e., the amount of remaining fuel in the fuel tank 12. The start switch 34 is operated by a driver (user) of the vehicle to turn on or off the engine 2. The vehicle speed sensor 38 senses a speed of the vehicle, on which the engine 2 is installed. Based on these signals, the ECU 30 executes various control operations for controlling, for example, a fuel injection quantity and fuel injection timing at each corresponding fuel injection valve 20.

In the ECU 30, the CPU executes control programs stored in the ROM or flash memory, so that the ECU 30 serves as a fuel property sensing means, a fuel property determining means, a fuel property sensing commanding means (or simply referred to as a commanding means), a fueling sensing means, a remaining fuel amount sensing means, a fuel property sensing frequency adjusting means, and a remaining fuel amount-based sensing frequency adjusting means.

Now, a predetermined prerequisite operational condition for the sensing of the fuel property will be descried.

When a fuel property of the fuel changes, a combustion state in the engine 2 changes. When the fuel injection quantity and the fuel injection timing at the fuel injection valve 20 are controlled in conformity with fuel having a predetermined fuel property, a reduction in the output torque or an increase in the noise level may possible occur. Therefore, the ECU 30 needs to sense the property of fuel, which is combusted at the engine 2, and needs to control the fuel injection quantity and the fuel injection timing at the fuel injection valve 20.

At the time of sensing the fuel property, the ECU 30 determines whether the current operational state is a deceleration fuel cut-off state. Here, it should be noted that the deceleration fuel cut-off state refers to a state, in which the fuel injection from the fuel injection valve 20 is cut-off upon turning off of an accelerator (e.g., upon releasing of a foot of a driver of the vehicle from an accelerator pedal) in the middle of traveling of the vehicle, so that the engine rotational speed is decelerated at generally a predetermined rate. When it is determined that the current operational state is the deceleration fuel cut-off state, the ECU 30 determines that a predetermined prerequisite operational condition for the sensing of the fuel property is satisfied. Therefore, the ECU 30 commands the fuel injection valve 20 to execute a fuel injection, which is dedicated to the sensing of the fuel property.

During the deceleration fuel cut-off state, the external disturbances, such as the load applied to the engine 2, become small. Therefore, when the fuel injection, which is dedicated to the sensing of the fuel property, is executed in the deceleration fuel cut-off state, it is possible to accurately sense a physical value that is related to the fuel combustion state of the engine 2, which changes depending on the fuel property. The physical value, which is related to the combustion state of the engine 2 at the time of executing the fuel injection dedicated to the sensing of the fuel property, in the deceleration fuel cut-off state, may include the ignition timing in the cylinder of the engine 2 or the output torque of the engine 2. The ignition timing can be sensed based on the cylinder pressure, which is sensed with a cylinder pressure sensor (not shown) that is provided to each corresponding cylinder. The output torque of the engine 2 may be sensed based on the amount of change in the measured engine rotational speed, which is sensed based on a rate of change in the crank angle per unit time according to the measurements of the crank angle sensor 36. Then, the ECU 30 senses the fuel property based on the physical value, which is related to the combustion state of the engine 2.

Alternative to the deceleration fuel cut-off state, an idle state of the engine 2, in which the engine rotational speed is the idle speed and is thereby low, may be used as the predetermined prerequisite operational condition for the sensing of the fuel property. In the case of the idle state of the engine 2, the physical value, which is related to the combustion state of the engine 2, may be the engine rotational speed. The engine rotational speed in the idle state of the engine 2 changes depending on the fuel property.

Furthermore, presence of each of the intake air temperature and the coolant temperature in a corresponding predetermined temperature range, which is not too low and is not too high, may be used as the predetermined prerequisite operational condition for the sensing of the fuel property.

Now, the timing for executing the sensing of the fuel property will be described.

In the deceleration fuel cut-off state or the idle state, which serves as the predetermined prerequisite operational condition for the sensing of the fuel property, external disturbances are small, and thereby this type of the predetermined prerequisite operational condition is also suitable for the other control operations, which are other than the sensing of the fuel property. Thus, when the fuel property is sensed every time in the deceleration fuel cut-off state or the idle state of the engine, the execution of other control operation(s) other than the sensing of the fuel property may possibly be disturbed. Also, when the fuel injection, which is dedicated to the sensing of the fuel property, is executed every time in the deceleration fuel cut-off state, the fuel consumption may de deteriorated.

In view of the above points, upon each occurrence of satisfaction of selected one or more of the following conditions (1) to (3), the ECU 30 determines whether the predetermined prerequisite operational condition for the sensing of the fuel property, such as the deceleration fuel cut-off state or the idle state, is satisfied. When the answer to this inquiry is affirmative, the ECU 30 senses the fuel property once before the next occurrence of satisfaction of the selected one or more of the following conditions (1) to (3). In this way, the sensing frequency of the fuel property is advantageously reduced in comparison to the case where the fuel property is sensed every time the predetermined prerequisite operational condition for the sensing the fuel property is satisfied. Here, it should be noted that when the number of the selected condition(s) selected from the following conditions (1) to (3) is increased, the sensing frequency of the fuel property is increased.

(1) The engine 2 has consumed a predetermined amount of fuel.
(2) The vehicle has traveled through a predetermined distance (hereinafter, referred to as a predetermined travel distance).
(3) The operational cycle, which is from the starting of the engine 2 to the stopping of the engine 2, is executed for a predetermined number of time(s).

Furthermore, it is desirable that the fuel property is sensed upon satisfaction of the following condition (4) besides the above conditions (1) to (3). This is due to a possibility of supplying of a different fuel, which has a different fuel property with respect to the fuel property of the fuel previously received in the fuel tank 12, at the time of fueling at a gas station.

(4) Fuel is supplied into the fuel tank 12.

Next, the sensing of the fuel property will be described with reference to FIGS. 2 to 13.

Figure 2:
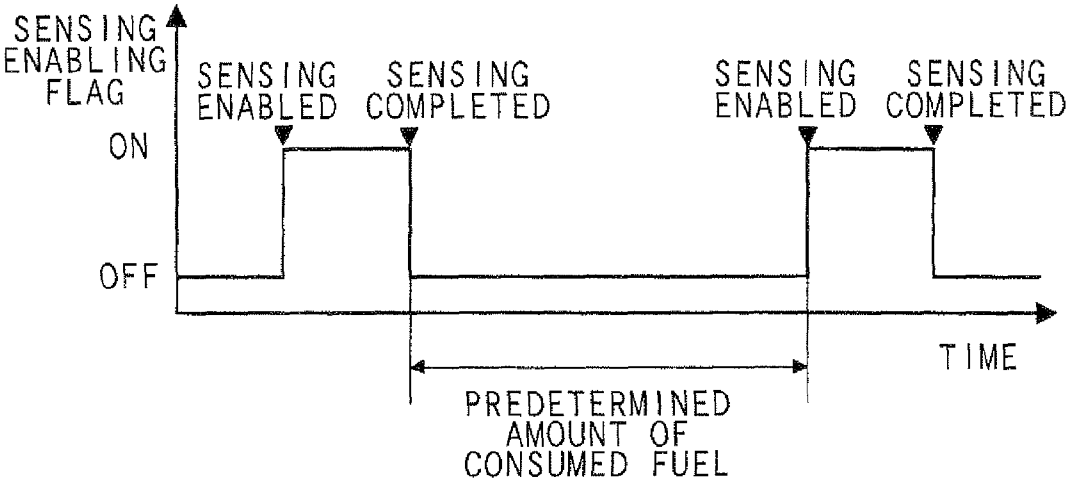
FIG. 2 is a time chart, which shows sensing of a fuel property executed upon each occurrence of consumption of a predetermined amount of fuel.

FIG. 2 shows a time chart for executing a first fuel property sensing routine. Upon each occurrence of consumption of the predetermined amount of fuel, when the predetermined prerequisite operational condition for the sensing of the fuel property is satisfied, the ECU 30 senses the fuel property. Here, if the predetermined amount of fuel is increased, the sensing frequency of the fuel property is reduced. In contrast, if the predetermined amount of fuel is decreased, the sensing frequency of the fuel property is increased. Specifically, the predetermined amount of fuel is a parameter for determining the sensing frequency of the fuel property. Also, the predetermined amount of fuel serves as a sensing interval value, which is an interval between each occurrence of the sensing of the fuel property and the next occurrence of the sensing of the fuel property.

In FIG. 2, an on-period of a sensing enabling flag, during which the sensing enabling flag is turned on, is from the time of occurrence of the consumption of the predetermined amount of fuel to the time of occurrence of the sensing of the fuel property by the ECU 30 upon satisfaction of the predetermined prerequisite operational condition for the sensing of the fuel property. An off-period of the sensing enabling flag, during which the sensing enabling flag is turned off, is from the time of occurrence of the sensing of the fuel property by the ECU 30 to the time of occurrence of the consumption of the predetermined amount of fuel.

Next, a first fuel property sensing routine will be described with reference to FIG. 3. The routine shown in FIG. 3 is always executed at the predetermined timing.

Figure 3:
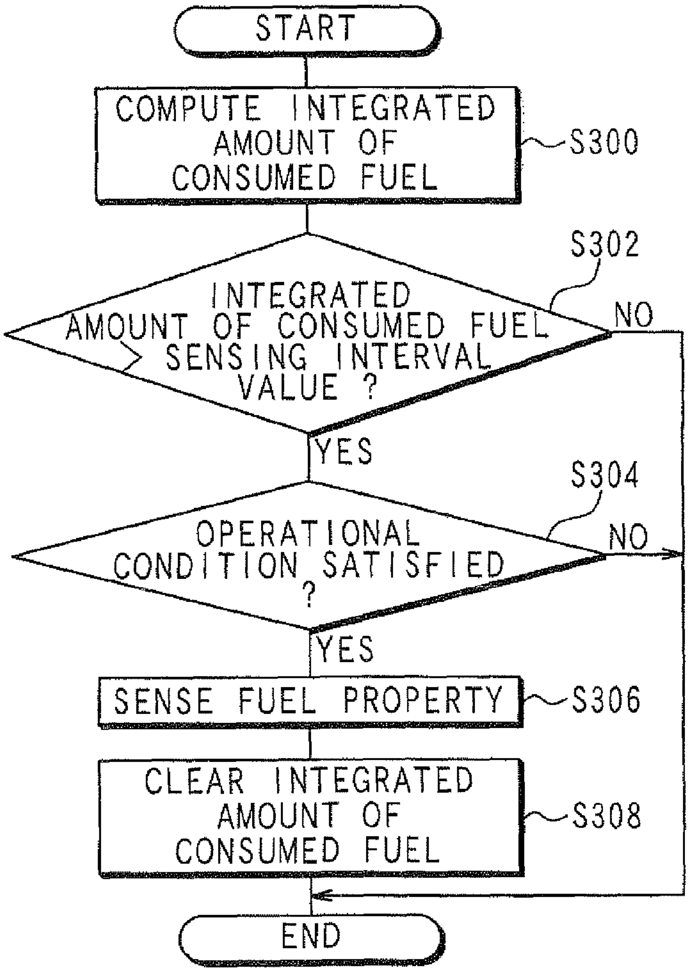
FIG. 3 is a flowchart showing a first fuel property sensing routine, which is executed upon each occurrence of the consumption of the predetermined amount of fuel.

At step S300 of FIG. 3, the ECU 30 integrates the amount of fuel consumption (the amount of consumed fuel) based on the output signal of the fuel level sensor 32 to obtain the integrated amount of consumed fuel (i.e., the total amount of the consumed fuel, which has been measured since the end of the previous sensing of the fuel property). Then, at step S302, the ECU 30 determines whether the integrated amount of consumed fuel is larger than the sensing interval value, which is the predetermined amount of fuel. In other words, at step S302, the ECU 30 determines whether the total amount of the consumed fuel, which has been measured since the end of the previous sensing of the fuel property, is larger than the predetermined amount of fuel. When the ECU 30 determines that the integrated amount of consumed fuel is equal to or smaller than the sensing interval value at step S302 (i.e., NO at step S302), the ECU 30 terminates the present routine.

When the ECU 30 determines that the integrated amount of consumed fuel is larger than the sensing interval value at step S302 (i.e., YES at step S302), the ECU 30 proceeds to step S304. At step S304, the ECU 30 determines whether the predetermined prerequisite operational condition for the sensing of the fuel property is satisfied. The predetermined prerequisite operational condition may be that the operational state of the engine 2 is in the deceleration fuel cut-off state or that the operational state of the engine 2 is in the idle state. When the ECU 30 determines that the predetermined prerequisite operational condition is not satisfied at step S304 (i.e., NO at step S304), the ECU 30 terminates the present routine.

In the case where the deceleration fuel cut-off state is used as the predetermined prerequisite operational condition, when the ECU 30 determines that this predetermined prerequisite operational condition is satisfied at step S304 (i.e., YES at step S304), the ECU 30 proceeds to step S306. At step S306, the ECU 30 commands the fuel injection valve 20 to execute the fuel injection, which is dedicated to the sensing of the fuel property. Then, the ECU 30 senses the ignition timing at the corresponding cylinder as the physical value, which indicates the combustion state, based on a change in the cylinder pressure that is sensed according to the output signal of the cylinder pressure sensor or based on a change in the engine rotational speed that is sensed according to the output signal of the crank angle sensor. Thereafter, the ECU 30 obtains the fuel property with reference to a characteristic map, which indicates a relationship between the ignition timing and the fuel property. Alternatively, in the case where the idle state is used as the predetermined prerequisite operational condition, when the ECU 30 determines that this predetermined prerequisite operational condition is satisfied at step S304 (i.e., YES at step S304), the ECU 30 proceeds to step S306. At step S306, the ECU 30 senses, i.e., obtains the fuel property with reference to a characteristic map, which indicates a relationship between the engine rotational speed in the idle state and the fuel property.

When the fuel property is sensed at step S306, the ECU 30 proceeds to step S308. At step S308, the ECU 30 clears, i.e., resets the integrated amount of consumed fuel to 0 (zero) and terminates the present routine. Since the ECU 30 clears the integrated amount of consumed fuel to 0 (zero) at step S308 upon the sensing of the fuel property, the fuel property is sensed only once upon satisfaction of the predetermined prerequisite operational condition before the next occurrence of the consumption of the predetermined amount of fuel.

In the first fuel property sensing routine, step S304 corresponds to the determining means, and step S306 corresponds to the fuel property sensing means. Furthermore, steps S302, S304, S306 correspond to the property sensing commanding means.

Now, a second fuel property sensing routine will be described.

Figure 4:
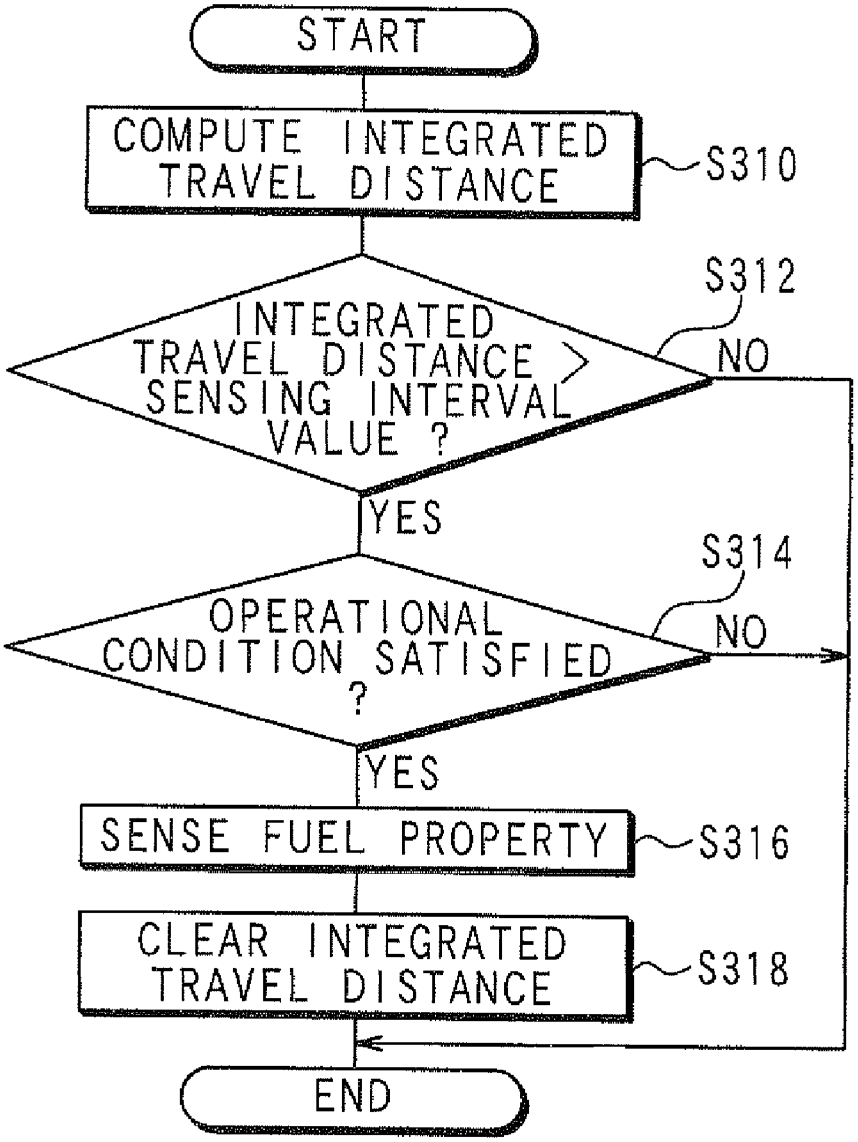
FIG. 4 is a flowchart showing a second fuel property sensing routine, which is executed upon each occurrence of traveling of a vehicle through a predetermined travel distance.

In a case of the second fuel property sensing routine shown in FIG. 4, upon each occurrence of traveling of the vehicle through the predetermined travel distance, when the predetermined prerequisite operational condition for the sensing of the fuel property is satisfied, the ECU 30 senses the fuel property. Here, if the predetermined travel distance is increased, the sensing frequency of the fuel property is reduced. In contrast, if the predetermined travel distance is decreased, the sensing frequency of the fuel property is increased. Specifically, the predetermined travel distance, which is traveled by the vehicle, is a parameter for determining the sensing frequency of the fuel property. Also, the predetermined travel distance serves as a sensing interval value, which is an interval between each occurrence of the sensing of the fuel property and the next occurrence of the sensing of the fuel property.

At step S310 of FIG. 4, the ECU 30 integrates the travel distance of the vehicle to obtain an integrated travel distance (a total travel distance of the vehicle, which has been measured since the end of the previous sensing of the fuel property). Then, at step S312, the ECU 30 determines whether the integrated travel distance, which is computed at step S310, is larger than the sensing interval value, which is the predetermined travel distance. When the ECU 30 determines that the integrated travel distance is equal to or smaller than the sensing interval value at step S312 (i.e., NO at step S312), the ECU 30 terminates the present routine.

When the ECU 30 determines that the integrated travel distance is larger than the sensing interval value at step S312 (i.e., YES at step S312), the ECU 30 proceeds to step S314. At step S314, the ECU 30 determines whether the predetermined prerequisite operational condition for the sensing of the fuel property is satisfied. When the ECU 30 determines that the predetermined prerequisite operational condition is not satisfied at step S314 (i.e., NO at step S314), the ECU 30 terminates the present routine.

When the ECU 30 determines that the predetermined prerequisite operational condition is satisfied at step S314 (i.e., YES at step S314), the ECU 30 proceeds to step S316. At step S316, the ECU 30 senses the fuel property in a manner similar to that of step S306 of FIG. 3. As discussed above, the predetermined prerequisite operational condition may be the deceleration fuel cut-off state or the idle state.

Upon the sensing of the fuel property at step S316, the ECU 30 proceeds to step S318. At step S318, the ECU 30 clears the integrated travel distance to 0 (zero) and terminates the present routine. As discussed above, the ECU 30 clears the integrated travel distance to 0 (zero) at step S318 upon the sensing of the fuel property. Therefore, upon each occurrence of the traveling of the vehicle through the predetermined travel distance, when the predetermined prerequisite operational condition for the sensing of the fuel property is satisfied, the ECU 30 senses the fuel property only once before the next occurrence of the traveling of the vehicle through the predetermined travel distance.

According to the second fuel property sensing routine, the fuel property can be sensed based on an output of a travel distance meter, which senses the travel distance of the vehicle, even in a case where the fuel level sensor 32, which senses the amount of remaining fuel in the fuel tank 12, is abnormal.

In the second fuel property sensing routine, step S314 corresponds to the determining means, and step S316 corresponds to the fuel property sensing means. Furthermore, steps S312, S314, S316 correspond to the fuel property sensing commanding means.

Now, a third fuel property sensing routine will be described.

Figure 5A:
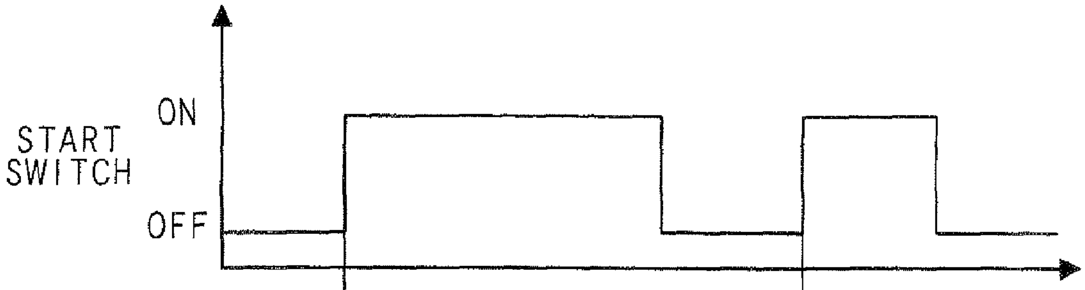
FIGS. 5A and 5B are time charts, which show sensing of a fuel property executed upon each occurrence of turning-on of a start switch of an internal combustion engine.
Figure 5B:
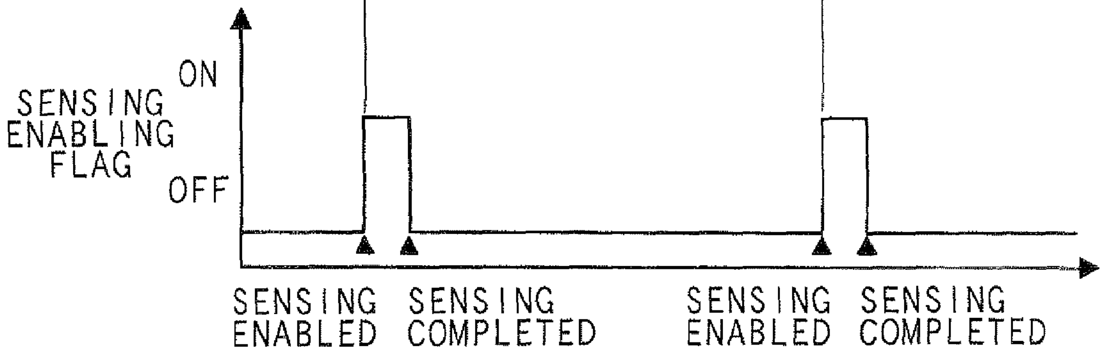

FIGS. 5A and 5B show time charts for executing the third fuel property sensing routine. Upon each occurrence of starting of one operation cycle of the engine 2 from the starting of the engine 2 to the stopping of the engine 2, when the predetermined prerequisite operational condition for the sensing of the fuel property is satisfied, the ECU 30 senses the fuel property.

In FIG. 5A, the state of "ON" of the start switch indicates that the engine 2 is currently running. Furthermore, the state of "OFF" of the start switch indicates that the engine 2 is currently stopped. In FIG. 5B, the on-period of the sensing enabling flag is a period from the time of turning on of the start switch to the time of sensing of the fuel property. Furthermore, the off-period of the sensing enabling flag is a period from the time of sensing of the fuel property to the time of turning on of the start switch.

With reference to FIGS. 5A and 5B, upon each occurrence of the starting of the one operation cycle through the operation of the start switch from the off-position to the on-position, when the predetermined prerequisite operational condition for the sensing of the fuel property is satisfied, the ECU 30 senses the fuel property. The number of operation(s) of the start switch from the off-position to the on-position is not limited to one. That is, the number of operation(s) of the start switch, i.e., the number of operation cycle(s) may be one or more. In other words, this may be modified as follows. That is, upon each occurrence of execution of a predetermined number of operation cycle(s) through the operation of the start switch from the off-position to the on-position for a predetermined number of time(s), when the predetermined prerequisite operational condition for the sensing of the fuel property is satisfied, the ECU 30 may sense the fuel property.

Here, if the predetermined number of the operation cycle (s) is increased, the sensing frequency of the fuel property is reduced. In contrast, if the predetermined number of the operation cycle(s) is decreased, the sensing frequency of the fuel property is increased. Specifically, the predetermined number of the operation cycle(s) is a parameter for determining the sensing frequency of the fuel property. Also, the predetermined number of the operation cycle(s) serves as a sensing interval value, which is an interval between each occurrence of the sensing of the fuel property and the next occurrence of the sensing of the fuel property.

Next, the third fuel property sensing routine will be described with reference to FIG. 6. The routine of FIG. 6 is executed every time the start switch is operated from the off position to the on-position for the predetermined number of time(s) (i.e., upon the execution of the predetermined number of the operation cycle(s)).

Figure 6:
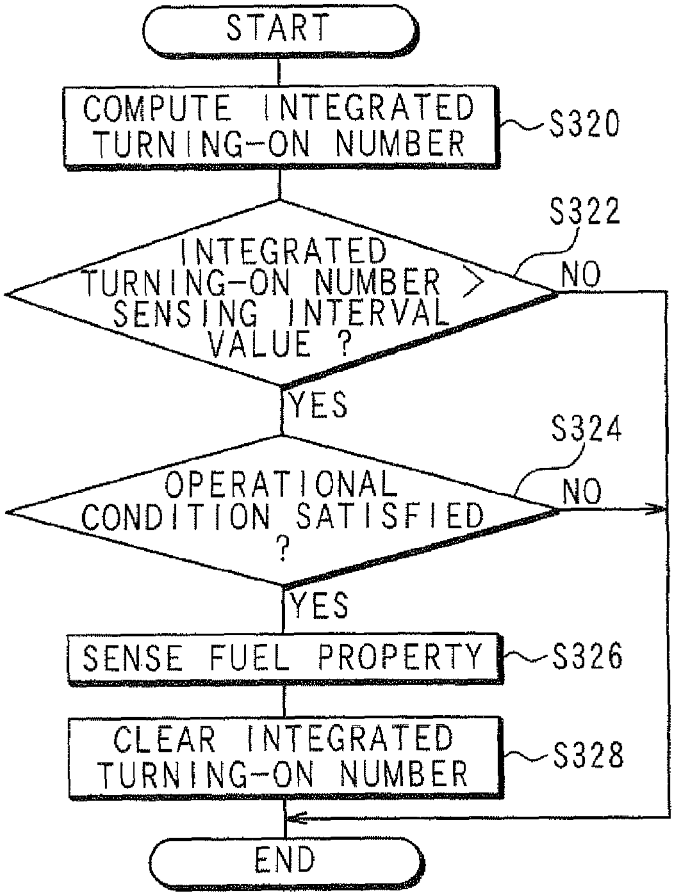
FIG. 6 is a flowchart showing a third fuel property sensing routine, which is executed upon operation of the start switch from an off-position to an on-position for a predetermined number of time(s)

At step S320 of FIG. 6, the ECU 30 integrates the number of the operation cycle(s), i.e., the number of time(s) of operation of the start switch from the off-position to the on-position (also, referred to as a turning-on number) to obtain an integrated turning-on number (i.e., a total number of times of the operation of the start switch from the off-position to the on-position, i.e., the total number of the operation cycle(s) since the end of the previous sensing of the fuel property value). Then, the ECU 30 proceeds to step S322. At step S322, the ECU 30 determines whether the integrated turning-on number is larger than the sensing interval value, which is the predetermined number of the operation cycle(s). In a case where the fuel property is sensed when the integrated turning-on number is "n", the sensing interval, which is the predetermined number, is set to be n−1. When the ECU 30 determines that the integrated turning-on number is equal to or less than the sensing interval at step S322 (i.e., NO at step S322), the ECU 30 terminates the present routine.

When the ECU 30 determines that the integrated turning-on number is larger than the sensing interval value at step S322 (i.e., YES at step S322), the ECU 30 proceeds to step S324. At step S324, the ECU 30 determines whether the predetermined prerequisite operational condition for the sensing of the fuel property is satisfied. When the ECU 30 determines that the predetermined prerequisite operational condition is not satisfied at step S324 (i.e., NO at step S324), the ECU 30 terminates the present routine.

When the ECU 30 determines that the predetermined prerequisite operational condition is satisfied at step S324 (i.e., YES at step S324), the ECU 30 proceeds to step S326. At step S326, the ECU 30 senses the fuel property in a manner similar to that of step S306 of FIG. 3. As discussed above, the predetermined prerequisite operational condition may be the deceleration fuel cut-off state or the idle state.

Upon the sensing of the fuel property at step S326, the ECU 30 proceeds to step S328. At step S328, the ECU 30 clears the integrated turning-on number to 0 (zero) and terminates the present routine. As discussed above, the ECU 30 clears the integrated turning-on number to 0 (zero) at step S328 upon the sensing of the fuel property. Therefore, upon each occurrence of the execution of the predetermined number of the operation cycle(s), when the predetermined prerequisite operational condition for the sensing of the fuel property is satisfied, the ECU 30 senses the fuel property only once before the next occurrence of the execution of the predetermined number of operation cycle(s).

In the third fuel property sensing routine, even in the case where the fuel level sensor 32, which senses the fuel level in the fuel tank 12, has the abnormality, it is possible to sense the fuel property based on the turning-on and turning-off of the start switch of the engine 2.

Also, in the third fuel property sensing routine, upon each occurrence of the execution of the predetermined number of the operation cycle(s) (i.e., upon each occurrence of the execution of the predetermined number of the start(s) of the operation cycle), when the predetermined prerequisite operational condition for the sensing of the fuel property is satisfied, the fuel property is sensed. Alternatively, as long as it is still in the middle of each corresponding operation cycle, it is possible to determine whether the predetermined prerequisite operational condition is satisfied at any timing in the operation cycle.

In the third fuel property sensing routine, step S324 corresponds to the determining means, and step S326 corresponds to the fuel property sensing means. Furthermore, steps S322, S324, S326 correspond to the property sensing operation commanding means.

In the first to third fuel property sensing routines described above, upon each occurrence of consumption of the predetermined amount of fuel, upon each occurrence of traveling of the vehicle through the predetermined travel distance, or upon each occurrence of the execution of the predetermined number of the operation cycle(s), when the predetermined prerequisite operational condition is satisfied, the fuel property is sensed. Therefore, in comparison to the case where the fuel property is sensed upon the satisfaction of the predetermined prerequisite operational condition, the sensing frequency of the fuel property is reduced. In the case where the fuel injection, which is dedicated to the sensing of the fuel property, is executed in the deceleration fuel cut-off state, the sensing frequency of the fuel property can be reduced to reduce the fuel consumption. Furthermore, it is possible to increase the frequency of execution of the other control operation(s) upon the satisfaction of the predetermined prerequisite operational condition for the sensing of the fuel property.

Upon each occurrence of consumption of the predetermined amount of fuel, upon each occurrence of traveling of the vehicle through the predetermined travel distance, or upon each occurrence of the execution of the predetermined number of the operation cycle(s), when the predetermined prerequisite operational condition for the sensing of the fuel property is satisfied, the fuel property is sensed. Therefore, it is possible to sense the change in the fuel property with the time caused by the supply of the fuel having the different fuel property into the fuel tank. Also, besides the case of supplying the fuel having the different fuel property into the fuel tank 12, it is possible to sense the change in the fuel property in a case where an additive, which causes an increase in the cetane number of the fuel, is added into the fuel tank 12.

Now, a fourth fuel property sensing routine will be described.

Figure 7:
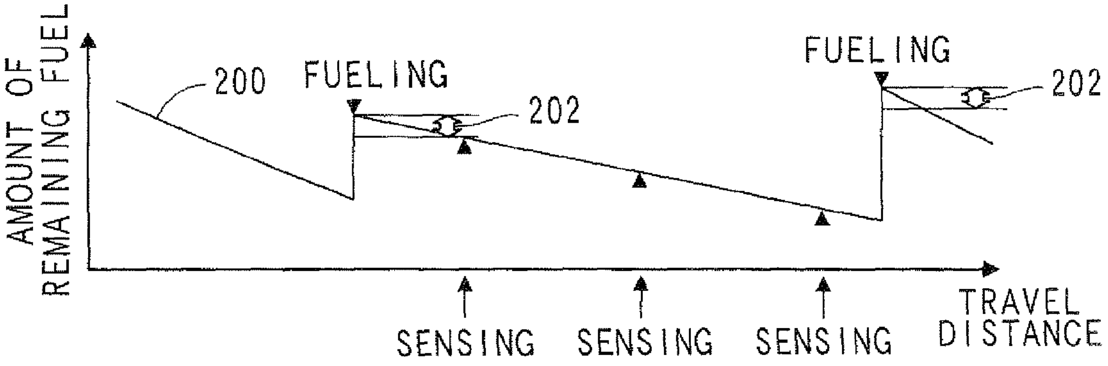
FIG. 7 is a time chart, which shows sensing of a fuel property executed upon each occurrence of fueling of a fuel tank.

FIG. 7 shows a time chart for executing the fourth fuel property sensing routine. As shown in FIG. 7, upon each occurrence of fueling of the fuel tank 12, i.e., upon each occurrence of supplying of fuel into the fuel tank 12 to rapidly increase the amount 200 of remaining fuel in the fuel tank 12 at the time of fueling, when the fuel is consumed in the amount, which exceeds a volume 202 of the fuel supply system that injects fuel supplied from the fuel tank 12 into the cylinders of the engine 2 through the fuel injection valves 20, and the predetermined prerequisite operational condition for the sensing of the fuel property is satisfied, the ECU 30 senses the fuel property. Thereafter, in the remaining period, which is up to the next fueling of the fuel tank 12, upon each occurrence of reaching the corresponding sensing interval value discussed with reference to the corresponding one of the first to third fuel property sensing routines, when the predetermined prerequisite operational condition for the sensing of the fuel property is satisfied, the ECU 30 may sense the fuel property. In other words, in the remaining period discussed above, the ECU 30 may sense the fuel property in the state where the predetermined prerequisite operational condition for the sensing of the fuel property is satisfied upon each occurrence of consumption of the predetermined amount of fuel, upon each occurrence of traveling of the vehicle through the predetermined travel distance, and/or upon each occurrence of the execution of the predetermined number of the operation cycle(s).

At the time of fueling for supplying the fuel into the fuel tank 12, there is the possibility of supplying of the different fuel, which has the different fuel property with respect to the fuel property of the fuel previously present in the fuel tank 12, so that it is desirable to sense the fuel properly immediately after the supplying of the fuel into the fuel tank 12. However, even when the fuel property of the fuel in the fuel tank 12 is changed due to the fueling, the previous fuel, which has been previously present in the fuel tank 12 before the fueling, still remains in the fuel supply system, which extends from the fuel tank 12 to the engine 2. Therefore, upon the fueling, when the fuel property is sensed after the occurrence of the consumption of the fuel in the amount, which corresponds to the volume 202 of the fuel supply system, the fuel property of the fuel, which is changed by the fueling, can be accurately sensed.

Figure 8:
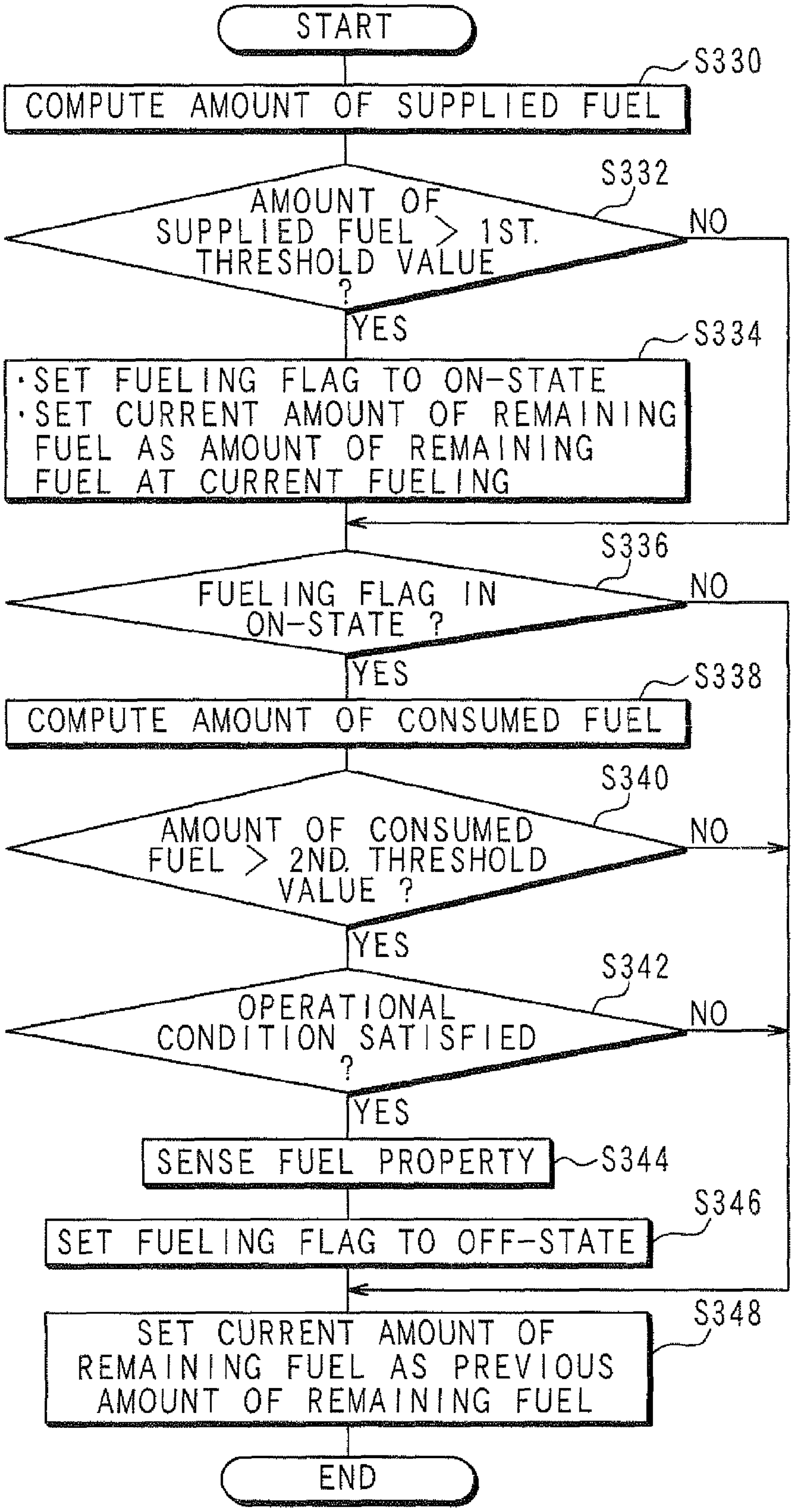
FIG. 8 is a flowchart showing a fourth fuel property sensing routine, which is executed upon each occurrence of the fueling of the fuel tank.

FIG. 8 is the routine for sensing the fuel property at the time of satisfaction of the predetermined prerequisite operational condition for the sensing of the fuel property upon the occurrence of the consumption of the fuel in the amount, which corresponds to the volume 202 of the fuel supply system, after each occurrence of fueling for supplying the fuel into the fuel tank 12. The routine of FIG. 8 is always executed at the predetermined timing in combination with one or more of the first to third fuel property sensing routines discussed above.

At step S330, the ECU 30 obtains a difference between the current amount of remaining fuel, which is currently sensed with the fuel level sensor 32, and the previous amount of remaining fuel, which is previously sensed with the fuel level sensor 32 at the time of executing the present routine in the previous time. The ECU 30 sets this difference as the amount of supplied fuel. Then, the ECU 30 proceeds to step S332. At step S332, the ECU 30 determines whether the amount of supplied fuel is larger than a predetermined first threshold value. The first threshold value is set to a predetermined value in view of, for example, a sensing error of the fuel level sensor 32 to limit occurrence of an erroneous sensing of the occurrence of the fueling.

When the ECU 30 determines that the amount of supplied fuel is equal to or smaller than the first threshold value at step S332 (i.e., NO at step S332), the ECU 30 proceeds to step S336. When the amount of supplied fuel is equal to or smaller than the first predetermined threshold value, it indicates that the fuel is not supplied into the fuel tank 12.

When the ECU 30 determines that the amount of supplied fuel is larger than the first threshold value at step S332 (i.e., YES at step S332), the ECU 30 proceeds to step S334. At step S334, the ECU 30 sets a fueling flag into an on-state and also sets the current amount of remaining fuel as the amount of remaining fuel at the current fueling. When the fueling flag is in the on-state, it indicates that the fuel property has not been sensed in the fueled state. In contrast, when the fueling flag is in the off-state, it indicates that the fuel has not been supplied into the fuel tank 12 after the time of sensing the fuel property.

By executing the operation at step S334, the ECU 30 memorizes the occurrence of the fueling to the fuel tank 12 and stores the amount of remaining fuel of the fuel tank 12 at the time of fueling.

At step S336, the ECU 30 determines whether the fueling flag is in the on-state. When the fueling flag is in the off-state (i.e., NO at step S336), the ECU 30 proceeds to step S348. When the fueling flag is in the on-state (i.e., YES at step S336), the ECU 30 proceeds to step S338. At step S338, the ECU 30 sets a difference between the amount of remaining fuel at the time of fueling and the current amount of remaining fuel as the amount of consumed fuel. The amount of consumed fuel is 0 (zero) right after the fueling. Every time the present routine is executed after consuming some of fuel upon the fueling, the amount of consumed fuel, which is sensed at step S338, is increased.

At step S340, the ECU 30 determines whether the amount of consumed fuel is larger than a second threshold value in the state where the fueling flag is in the on-state (i.e., YES at step S336). The second threshold value is set to be equal to the volume of the fuel supply system, which supplies fuel from the fuel tank 12 to the engine 2. This is due to the following fact. That is, even when the fuel is newly supplied into the fuel tank 12 at the time of fueling, the fuel, which remains in a fuel pipe and a fuel filter of the fuel supply system, is not mixed with the newly supplied fuel. Therefore, the fuel, which is combusted in the engine 2, is the previous remaining fuel present in the fuel tank 12 before the fueling until the corresponding amount of fuel, which is larger than the volume of the fuel supply system, is consumed by the engine 2.

When the ECU 30 determines that the amount of consumed fuel is equal to or smaller than the second threshold value at step S340 (i.e., NO at step S340), the ECU 30 proceeds to step S348. In contrast, when the ECU 30 determines that the amount of consumed fuel is larger than the second threshold value at step S340 (i.e., YES at step S340), the ECU 30 proceeds to step S342. At step S342, the ECU 30 determines whether the predetermined prerequisite operational condition for the sensing of the fuel property is satisfied in the state where the fueling flag is in the on-state (YES at step S336). As discussed above, the predetermined prerequisite operational condition may be that the engine 2 is in the deceleration fuel cut-off state or the engine 2 is in the idle state.

When the ECU 30 determines that the predetermined prerequisite operational condition is not satisfied at step S342 (i.e., NO at step S342), the ECU 30 proceeds to step S348. When the ECU 30 determines that the predetermined prerequisite operational condition is satisfied at step S342 (i.e., YES at step S342), the ECU 30 proceeds to step S344. At step S344, the ECU 30 senses the fuel property in a manner similar to that of step S306 of FIG. 3.

After the sensing of the fuel property at step S344, the ECU 30 proceeds to step S346. At step S346, the ECU 30 sets the fueling flag into the off-state. As discussed above, the off-state of the fueling flag indicates that the fuel is not yet supplied into the fuel tank 12 since the time of sensing the fuel property.

At step S348, the ECU 30 sets the current amount of remaining fuel, which is sensed based on the output signal of the fuel level sensor 32 in the present routine, as the previous amount of remaining fuel, which is used at the time of executing the present routine next time.

By executing the routine of FIG. 8, the ECU 30 senses the fuel property upon the satisfaction of the predetermined prerequisite operational condition for the sensing of the fuel property through the consumption of fuel in the amount, which is larger than the volume 202 of the fuel supply system, after each occurrence of the supply of fuel into the fuel tank 12, causing the rapid increase of the amount 200 of remaining fuel in the fuel tank 12 at the time of fueling.

In the fourth fuel property sensing routine, step S332 corresponds to the fueling sensing means, and step S342 corresponds to the determining means. Furthermore, step S344 corresponds to the fuel property sensing means, and steps S340, S342, S344 correspond to the fuel property sensing commanding means.

Now, a fifth fuel property sensing routine will be described.

FIGS. 9A to 9D show a time chart for executing a fifth fuel property sensing routine. When fuel, which has a fuel property that is different from the fuel property of the fuel remaining in the fuel tank 12, is newly supplied into the fuel tank 12, a degree of mixing of the remaining fuel and the newly supplied fuel in the fuel tank 12 may possibly vary.

Figures 9A, 9B, 9C, 9D:
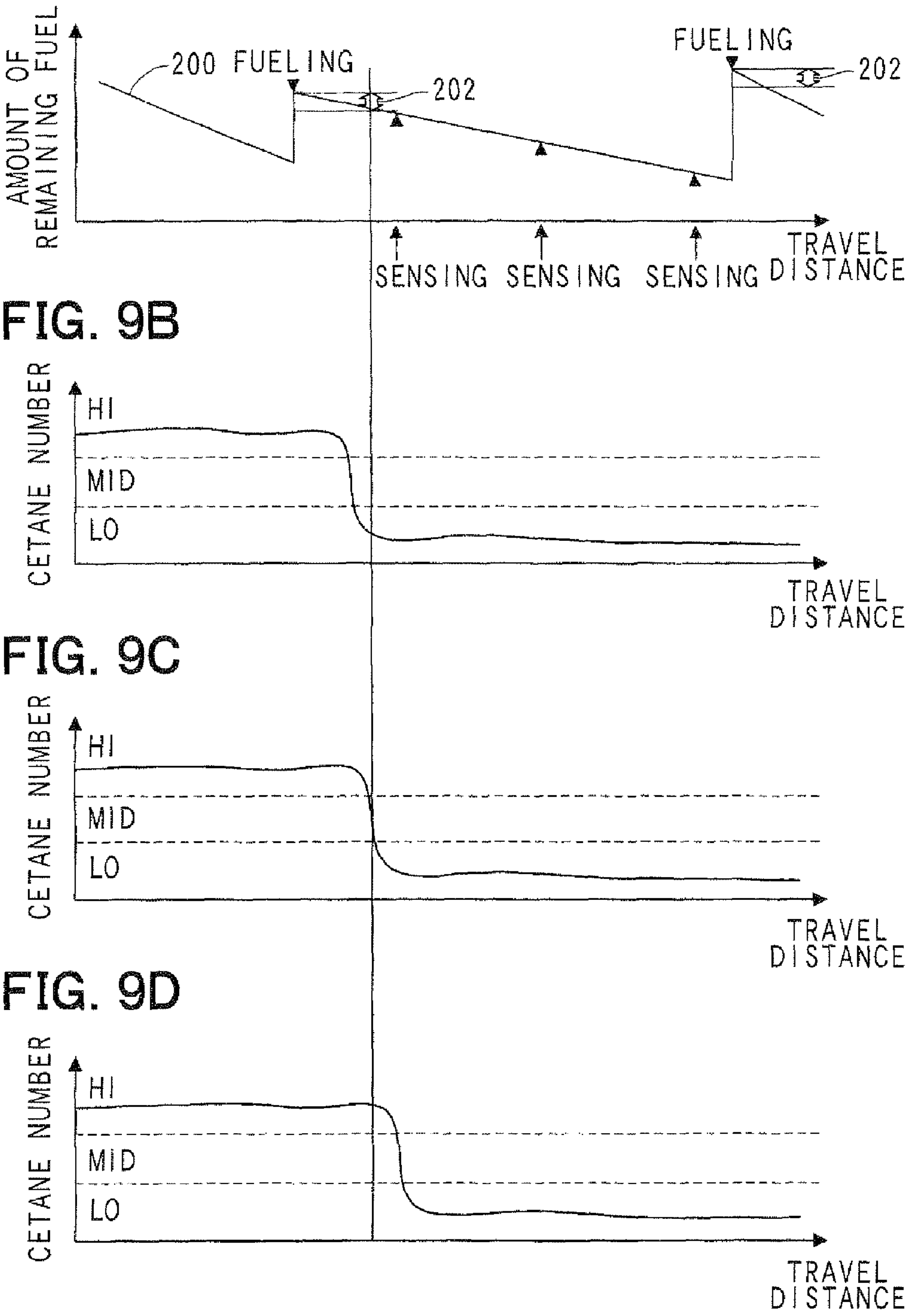
FIGS. 9A to 9D are time charts for describing differences between the cetane number of fuel before the fueling and the cetane number of fuel after the fueling.

For example, in the case of FIGS. 9A to 9D, it is assumed that the fuel, which has a low cetane number, is newly supplied into the fuel tank 12 that receives the remaining fuel, which has a high cetane number. In such a case, as shown in FIGS. 9B to 9D, the sensed cetane number of the mixed fuel may possibly vary among the low cetane number, the medium cetane number and the high cetane number depending on the degree of mixing of the remaining fuel and the newly supplied fuel in the fuel tank 12 at the time of sensing the fuel property for the first time upon satisfaction of the predetermined prerequisite operational condition for the sensing of the fuel property through the consumption of fuel in the amount, which is larger than the volume 202 of the fuel supply system, after the fueling.

Specifically, in the case of FIG. 9B, the sensed cetane number of the fuel, which is sensed before the fueling, is the high cetane number, and the sensed cetane number of the fuel, which is sensed for the first time after the fueling, is the low cetane number. In such a case, it is possible to determine that the sensed cetane number of the fuel, which is sensed for the first time after the fueling, is the low cetane number due to the supply of the fuel having the low cetane number into the fuel tank 12. That is, in the case where the sensed cetane number of the fuel, which is sensed before the fueling, is the high cetane number, and the sensed cetane number of the fuel, which is sensed for the first time after the fueling, is the low cetane number, the possibility of the erroneous sensing of the cetane number is "low".

In contrast, in the case of FIG. 9C, the sensed cetane number of the fuel, which is sensed before the fueling, is the high cetane number, and the sensed cetane number of the fuel, which is sensed for the first time after the fueling, is the medium cetane number. In such a case, because of the variation in the degree of mixing of the remaining fuel and the newly supplied fuel, it is difficult to determine which one of the fuel having the medium cetane number and the fuel having the low cetane number is newly supplied into the fuel tank that receives the remaining fuel, which has the high cetane number, at the time of sensing the fuel property for the first time after the fueling. Therefore, in the case of FIG. 9C, when the cetane number of the fuel is sensed, a possibility of the erroneous sensing of the cetane number is "medium".

In the case of FIG. 9D, the sensed cetane number of the fuel, which is sensed before the fueling, is the high cetane number, and the sensed cetane number of the fuel, which is sensed for the first time after the fueling, is the high cetane number. In such a case, because of the variation in the degree of mixing of the remaining fuel and the newly supplied fuel, it is difficult to determine which one of the fuel having the high cetane number, the fuel having the medium cetane number and the fuel having the low cetane number is newly supplied into the fuel tank that receives the remaining fuel, which has the high cetane number, at the time of sensing the fuel property for the first time after the fueling. Therefore, in the case of FIG. 9D, when the cetane number of the fuel is sensed, a possibility of the erroneous sensing of the cetane number is "high".

FIG. 10 shows the possibilities of the erroneous sensing for the various combinations of the sensed cetane number of fuel before the fueling and the sensed cetane number of fuel after the fueling, which are respectively indicated with corresponding one of High (H), Medium (M) and Low (L). In FIG. 10, when the sensed cetane number of fuel before the fueling and the sensed cetane number of fuel after the fueling are identical to each other, it is assumed that the possibility of the erroneous sensing is high. In contrast, when a difference between the sensed cetane number of fuel before the fueling and the sensed cetane number of fuel after the fueling are large like in the case where the cetane number of fuel before the fueling and the cetane number of fuel after the fueling are "H" and "L", respectively, it is assumed that the possibility of the erroneous sensing is low. When the difference between the sensed cetane number of fuel before the fueling and the sensed cetane number of fuel after the fueling is medium like in the case where the sensed cetane number of fuel before the fueling and the sensed cetane number of fuel after the fueling are "H" and "M", respectively, or "M" and "L", respectively, it is assumed that the possibility of the erroneous sensing is medium. When the possibility of the erroneous sensing is high, it is desirable that the sensing interval value, which indicates the interval between each occurrence of the sensing of the fuel property and the next occurrence of the sensing of the fuel property, is reduced to increase the sensing frequency of the fuel property, so that the accurate fuel property can be quickly sensed. In order to increase the sensing frequency of the fuel property, in the case of the first fuel property sensing routine of FIG. 3, it is conceivable to reduce the predetermined amount of fuel, which serves as the sensing interval value. Alternatively, in the case of the second fuel property sensing routine of FIG. 4, it is conceivable to reduce the predetermined travel distance, which serves as the sensing interval value. Further alternatively, in the case of the third fuel property sensing routine of FIG. 6, it is conceivable to reduce the predetermined number of the operation cycle(s), which serves as the sensing interval value.

Figure 11:
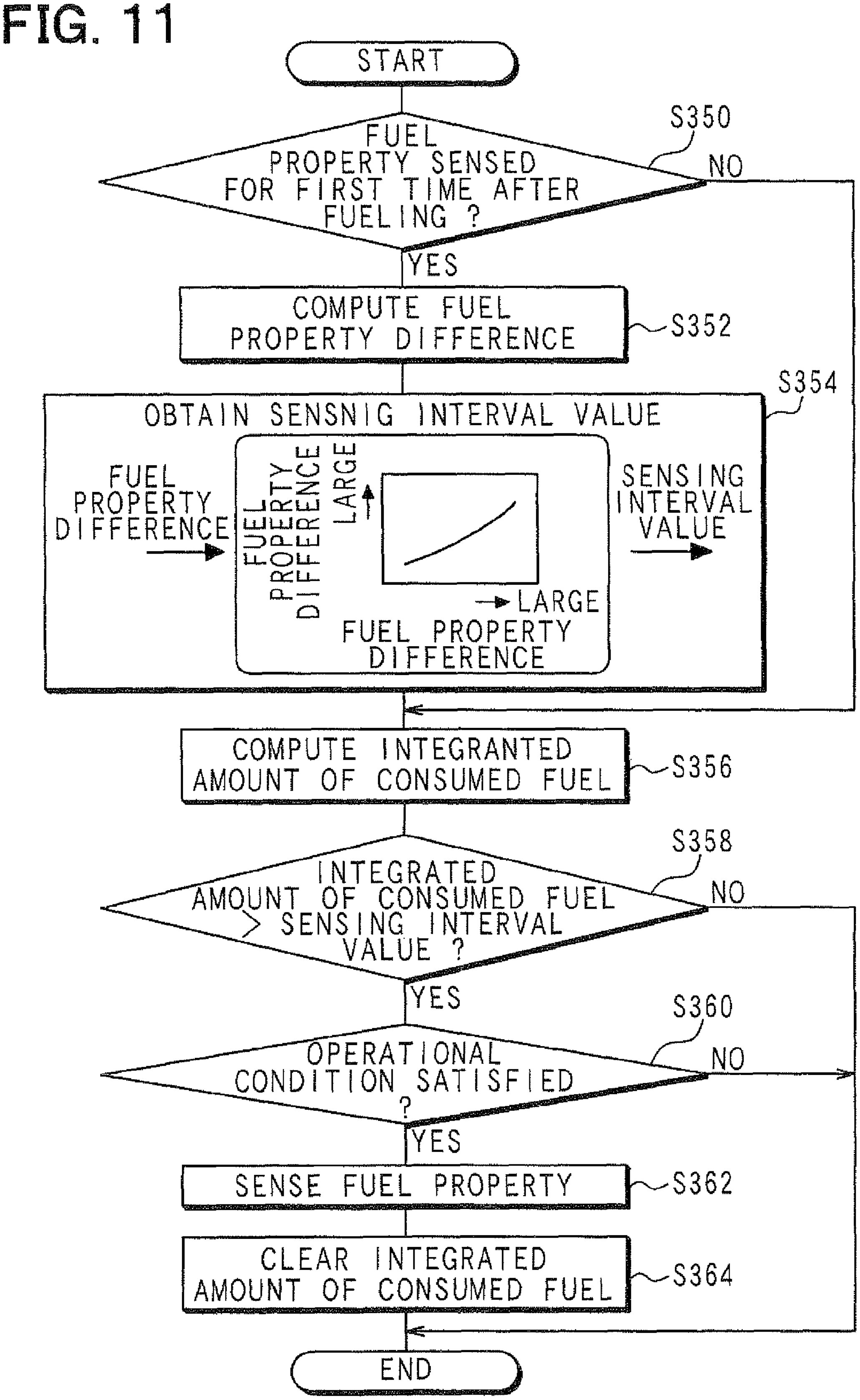
FIG. 11 is a flowchart showing a fifth fuel property sensing routine, which is executed based on the cetane number before the fueling and the cetane number after the fueling.

FIG. 11 shows the fifth fuel property sensing routine. The fifth fuel property sensing routine of FIG. 11 is executed in place of the first fuel property sensing routine of FIG. 3.

At step S350 of FIG. 11, the ECU 30 determines whether the current state is the state where the fuel property is sensed after satisfaction of the predetermined prerequisite operational condition for the sensing of the fuel property for the first time upon the consumption of fuel larger than the volume 202 of the fuel supply system after the fueling. When the current state is not the state where the fuel property is sensed for the first time after the fueling (i.e., NO at step S350), the ECU 30 proceeds to step S356.

When the current state is the state where the fuel property is sensed for the first time after the fueling (i.e., YES at step S350), the ECU 30 proceeds to step S352. At step S352, the ECU 30 computes a difference between the fuel property value after the fueling and the fuel property value before the fueling as a fuel property value difference Δ.

Then, at step S354, the ECU 30 obtains the corresponding sensing interval value, which is the predetermined amount of fuel, based on the fuel property value difference Δ with reference to a characteristic map that indicates a relationship between the fuel property value difference Δ and the sensing interval value (the predetermined amount of fuel). A predetermined value is set as the sensing interval value until the sensing of the fuel property value for the first time after the supplying of the fuel to the fuel tank 12, i.e., the predetermined value is set as the sensing interval value from the time of supplying the fuel to the fuel tank 12 to the execution of step S354.

At step S356, the ECU 30 integrates the amount of consumed fuel to obtain the integrated amount of consumed fuel. Then, at step S358, the ECU 30 determines whether the integrated amount of consumed fuel is larger than the sensing interval value. The sensing interval value, which is used for the determination at step S358 is the sensing interval value, which is obtained at step S354, or a predetermined value, which has been preset, until the time of executing step S354.

When the ECU 30 determines that the integrated amount of consumed fuel is equal to or smaller than the sensing interval value at step S358 (i.e., NO at step S358), the ECU 30 terminates the present routine. When the ECU 30 determines that the integrated amount of consumed fuel is larger than the sensing interval value at step S358 (i.e., YES at step S358), the ECU 30 proceeds to step S360. At step S360, the ECU 30 determines whether the predetermined prerequisite operational condition for the sensing of the fuel property is satisfied. When the ECU 30 determines that the predetermined prerequisite operational condition is not satisfied at step S360 (i.e., NO at step S360), the ECU 30 terminates the present routine. As discussed above, the predetermined prerequisite operational condition may be that the engine 2 is in the deceleration fuel cut-off state or the engine 2 is in the idle state.

When the ECU 30 determines that the predetermined prerequisite operational condition is satisfied at step S360 (i.e., YES at step S360), the ECU 30 proceeds to step S362. At step S362, the ECU 30 senses the fuel property in a manner similar to that of step S306 of FIG. 3.

Upon the sensing of the fuel property at step S362, the ECU 30 proceeds to step S364. At step S364, the ECU 30 clears the integrated amount of consumed fuel to 0 (zero) and terminates the present routine.

In the fifth fuel property sensing routine, the sensing interval value, which determines the sensing frequency of the fuel property, is obtained based on the fuel property value sensed before the fueling and the fuel property value sensed for the first time after the fueling. Thereby, based on the fuel property value sensed before the fueling and the fuel property value sensed for the first time after the fueling, when it is determined that the possibility of the erroneous sensing is high, the sensing interval value is reduced to increase the sensing frequency of the fuel property. In contrast, when it is determined that the possibility of the erroneous sensing is low, the sensing interval value is increased to decrease the sensing frequency of the fuel property. In this way, in the case where the possibility of the erroneous sensing is high, the sensing frequency of the fuel property is increased, so that the accurate fuel property can be quickly sensed.

In the fifth fuel property sensing routine, steps S352, S362 correspond to the fuel property sensing means, and step S354 corresponds to the fuel property sensing frequency adjusting means. Furthermore, step S360 corresponds to the determining means, and steps S358, S360, S362 correspond to the fuel property sensing commanding means.

Now, a sixth fuel property sensing routine will be described.

In the case where the cetane number of fuel sensed before the fueling is different from the cetane number of fuel newly supplied into the fuel tank 12, a degree of mixing of these fuels varies depending on a ratio between the amount of remaining fuel before the fueling and the amount of newly supplied fuel. Therefore, the possibility of erroneous sensing of the cetane number, which is sensed for the first time after the fueling, varies depending on the ratio between the amount of remaining fuel before the fueling and the amount of newly supplied fuel. The amount of newly supplied fuel can be computed based on a difference between the amount of remaining fuel after the fueling and the amount of remaining fuel before the fueling.

As shown in FIG. 12B, in the case where the ratio between the amount of remaining fuel before the fueling and the amount of newly supplied fuel is set such that the amount of remaining fuel before the fueling is the same as the amount of newly supplied fuel, the time required for these fuels to be mixed uniformly to have a constant cetane number is lengthened. Therefore, as shown in FIG. 12D, a possibility of erroneous sensing of the cetane number, which is sensed for the first time after the fueling, becomes high. In contrast, as shown in FIG. 12A or 12C, in the case where the ratio between the amount of remaining fuel before the fueling and the amount of newly supplied fuel is set such that one of the amount of remaining fuel before the fueling and the amount of newly supplied fuel is small, and the other one of the amount of remaining fuel before the fueling and the amount of newly supplied fuel is large, the time, which is required for these fuels to be mixed to cause shifting of the cetane number of the mixed fuel to the cetane number of the other one having the large amount, is short. Therefore, as shown in FIG. 12D, the possibility of erroneous sensing of the cetane number, which is sensed for the first time after the fueling, becomes low. When the possibility of the erroneous sensing is high, it is desirable that the sensing interval value, which indicates the interval between each occurrence of the sensing of the fuel property and the next occurrence of the sensing of the fuel property, is reduced to increase the sensing frequency of the fuel property, so that the accurate fuel property can be quickly sensed.

Figure 13:
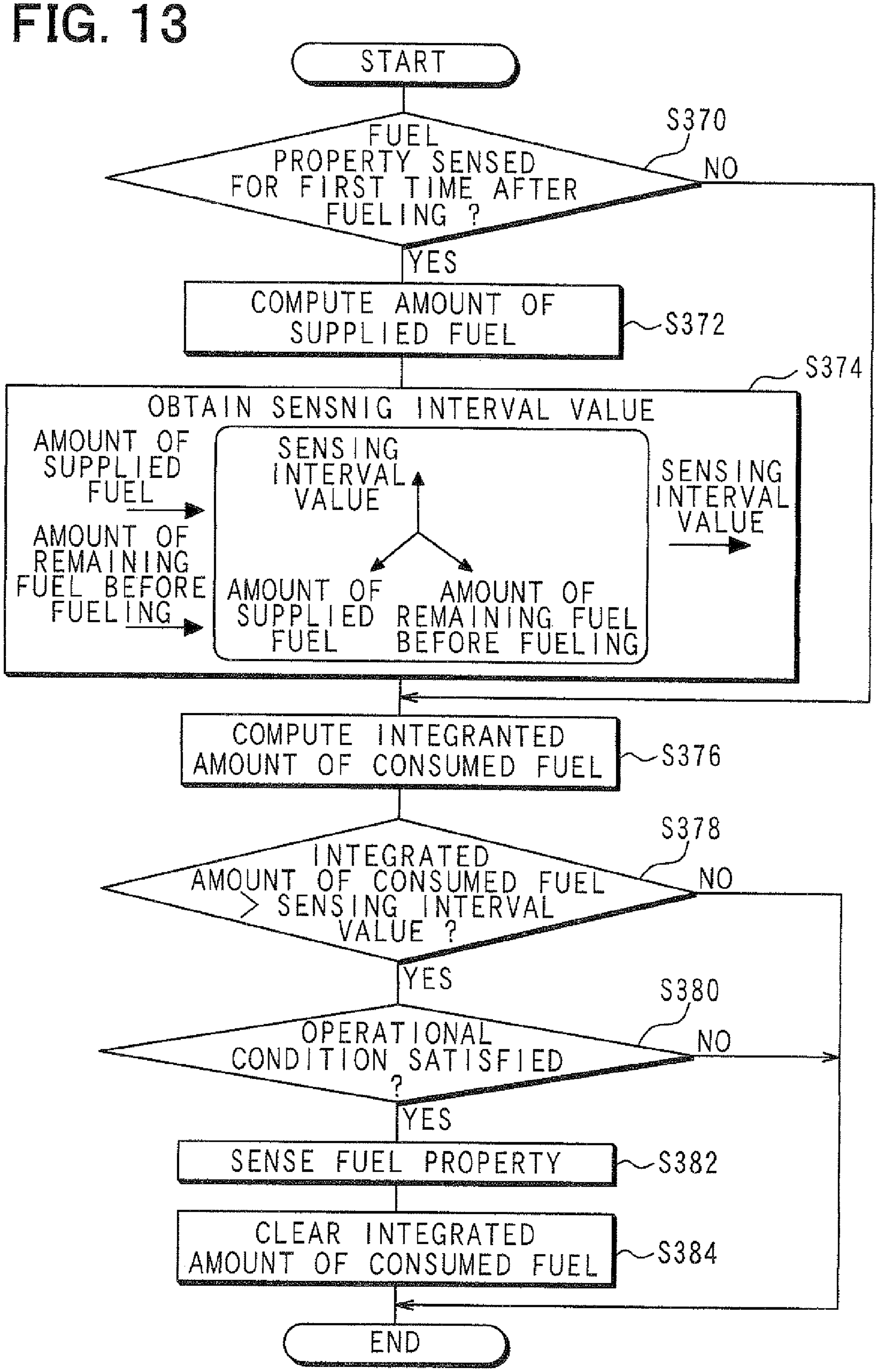
FIG. 13 is a flowchart showing a sixth fuel property sensing routine, which is executed based on the amount of remaining fuel in the fuel tank before the fueling and the amount of remaining fuel in the fuel tank after the fueling.

Therefore, in the sixth fuel property sensing routine of FIG. 13, the sensing frequency of the fuel property is set based on the ratio between the amount of remaining fuel before the fueling and the amount of newly supplied fuel.

Steps S370 and S376 to S384 are substantially the same as steps S350 and S356 to S364 of FIG. 11 and thereby will not be described further for the sake of When the ECU 30 determines that the current state is the state where the fuel property is sensed for the first time after the fueling at step S370 (i.e., YES at step S370), the ECU 30 proceeds to step S372. At step S372, the ECU 30 computes the amount of newly supplied fuel based on the amount of remaining fuel after the fueling and the amount of remaining fuel before the fueling.

Then, at step S374, the ECU 30 obtains the sensing interval value based on the ratio between the amount of remaining fuel before the fueling and the amount of newly supplied fuel with reference to a characteristic map, which indicates a relationship between the amount of remaining fuel before the fueling and the amount of newly supplied fuel. A predetermined value is set as the sensing interval value until the sensing of the fuel property value for the first time after the supplying of the fuel to the fuel tank 12, i.e., the predetermined value is set as the sensing interval value from the time of supplying the fuel to the fuel tank 12 to the execution of step S374.

In the sixth fuel property sensing routine, the ratio between the amount of remaining fuel and the amount of newly supplied fuel is obtained based on the amount of remaining fuel before the fueling and the amount of remaining fuel after the fueling. Then, the sensing interval value, which determines the sensing frequency of the fuel property, is obtained based on this ratio. Thereby, based on the amount of remaining fuel before the fueling and the amount of remaining fuel after the fueling, when it is determined that the possibility of the erroneous sensing of the fuel property is high, the sensing interval value is reduced to increase the sensing frequency of the fuel property. In contrast, when it is determined that the possibility of the erroneous sensing of the fuel property is low, the sensing interval value is increased to decrease the sensing frequency of the fuel property. In this way, in the case where the possibility of the erroneous sensing is high, the sensing frequency of the fuel property is increased, so that the accurate fuel property can be quickly sensed.

In the sixth fuel property sensing routine, step S372 corresponds to the remaining fuel amount sensing means, and step S374 corresponds to the remaining fuel amount-based sensing frequency adjusting means. Furthermore, step S380 corresponds to the determining means, and step S382 corresponds to the fuel property sensing means. Also, steps S378, S380, S382 correspond to the fuel property sensing commanding means.

In the fifth fuel property sensing routine, the predetermined amount of fuel is used as the parameter, which determines the sensing frequency of the fuel property, and the sensing frequency of the fuel property is adjusted based on the fuel property before the fueling and the fuel property after the fueling. In the sixth fuel property sensing routine, the predetermined amount of fuel is used as the parameter, which determines the sensing frequency of the fuel property, and the sensing frequency of the fuel property is adjusted based on the amount of remaining fuel before the fueling and the amount of remaining fuel after the fueling. Alternatively, in the fifth or sixth fuel property sensing routine, the predetermined travel distance of the vehicle, or the predetermined number of the operation cycle(s), may be used as the parameter for determining the sensing frequency of the fuel property, and the sensing frequency of the fuel property may be adjusted based on the amount of remaining fuel before the fueling and the amount of remaining fuel after the fueling.

Now, modifications of the above embodiment will be described.

In the above embodiment, the cetane number of fuel is sensed as the fuel property. Alternative to the cetane number, any other fuel property, which is other than the cetane number, may be sensed as long as the combustion state of the internal combustion engine varies depending on that fuel property.

Also, as long as the combustion state of the internal combustion engine changes depending on a change in the fuel property, the fuel property may be sensed in any other type of fuel combustion engine, which is other than the diesel engine, or for any other type of fuel.

In the above embodiment, the functions of the property sensing means, the determining means, the property sensing commanding means, the fueling sensing means, the remaining fuel amount sensing means, the property sensing frequency adjusting means, and the remaining fuel amount-based sensing frequency adjusting means are implemented by the ECU 30. In contrast, at least part of the functions of the property sensing means, the determining means, the property sensing commanding means, the fueling sensing means, the remaining fuel amount sensing means, the property sensing frequency adjusting means, and the remaining fuel amount-based sensing frequency adjusting means may be implemented by a corresponding hardware, in which the circuit structure itself specifies the corresponding function thereof.

As discussed above, the present invention is not limited to the above embodiment, and the above embodiment may be modified within the spirit and scope of the present invention. For instance, two or more of the first to sixth fuel property sensing routines may be combined in any combination, if desired. In one case, upon each occurrence of consumption of the predetermined amount of fuel, upon each occurrence of traveling of the vehicle through the predetermined travel distance, and/or upon each occurrence of the execution of the predetermined number of the operation cycle(s), when the predetermined prerequisite operational condition is satisfied, the ECU 30 may sense the fuel property. This may be implemented also in any one or more of the fourth to sixth fuel property sensing routines.

What is claimed is:

1. A fuel property sensing device for an internal combustion engine, comprising:

a fuel property sensing unit for sensing a fuel property of fuel based on a physical value, which is related to a combustion state of the fuel in the internal combustion engine;

a determining unit for determining whether a predetermined prerequisite operational condition for the sensing of the fuel property with the fuel property sensing unit is satisfied in the internal combustion engine;

a commanding unit for commanding the sensing of the fuel property to the fuel property sensing unit when the determining unit determines that the predetermined prerequisite operational condition is satisfied upon each occurrence of consumption of a predetermined amount of fuel that serves as a parameter for determining a sensing frequency of the fuel property, which is sensed with the fuel property sensing unit;

a fueling sensing unit for sensing an occurrence of fueling of a fuel tank, which stores fuel supplied to the internal combustion engine, wherein the commanding unit commands the fuel property sensing unit to sense the fuel property when the determining unit determines that the predetermined prerequisite operational condition is satisfied upon each occurrence of the sensing of the fueling of the fuel tank with the fueling sensing unit, wherein the commanding unit commands the fuel property sensing unit to sense the fuel property when the determining unit determines that the predetermined prerequisite operational condition is satisfied upon consumption of a predetermined amount of fuel, which corresponds to a volume of a fuel supply system that supplies the fuel from the fuel tank to the internal combustion engine, after each occurrence of the sensing of the fueling of the fuel tank with the fueling sensing unit;

a remaining fuel amount sensing unit for sensing the amount of remaining fuel in the fuel tank; and a remaining fuel amount-based sensing frequency adjusting unit for adjusting the sensing frequency of the fuel property by adjusting the parameter based on the amount of remaining fuel, which is sensed with the remaining fuel amount sensing unit before the fueling of the fuel tank, and the amount of remaining fuel, which is sensed with the remaining fuel amount sensing unit after the fueling of the fuel tank, wherein the remaining fuel amount based sensing frequency adjusting unit increases the sensing frequency of the fuel property by adjusting the parameter when the amount of remaining fuel, which is sensed with the remaining fuel amount sensing unit before the fueling of the fuel tank, is generally the same as the amount of newly supplied fuel that is supplied to the fuel tank in the fueling of the fuel tank.

2. The fuel property sensing device according to claim 1, wherein the commanding unit commands the fuel property sensing unit to sense the fuel property when the determining unit determines that the predetermined prerequisite operational condition is satisfied upon each occurrence of traveling of a vehicle, which has the internal combustion engine, through a predetermined travel distance that serves as a parameter for determining the sensing frequency of the fuel property, which is sensed with the fuel property sensing unit.

3. The fuel property sensing device according to claim 1, wherein:

the commanding unit commands the fuel property sensing unit to sense the fuel property when the determining unit determines that the predetermined prerequisite operational condition is satisfied upon each occurrence of execution of a predetermined number of operation cycle (s), each of which is from starting of the internal combustion engine to stopping of the internal combustion engine; and the predetermined number of the operation cycle(s) serves as a parameter for determining the sensing frequency of the fuel property, which is sensed with the fuel property sensing unit.

4. The fuel property sensing device according to claim 1, further comprising a fuel property sensing frequency adjusting unit for adjusting the sensing frequency of the fuel property by adjusting the parameter based on a difference between the fuel property, which is sensed with the fuel property sensing unit before the fueling, and the fuel property, which is sensed with the fuel property sensing unit after the fueling.

5. The fuel property sensing device according to claim 1, wherein:

the determining unit determines that the predetermined prerequisite operational condition is satisfied when an operational state of the internal combustion engine is a deceleration fuel cut-off state; and the fuel property sensing unit commands a fuel injection valve, which injects the fuel in the internal combustion engine, to execute a fuel injection, which is dedicated to the sensing of the fuel property, through the fuel injection valve upon the satisfying of the predetermined prerequisite operational condition, and the fuel property sensing unit senses the fuel property based on the physical value after the fuel injection, which is dedicated to the sensing of the fuel property.

6. The fuel property sensing device according to claim 1, wherein the amount of newly supplied fuel is determined based on a difference between the amount of remaining fuel, which is sensed with the remaining fuel amount sensing unit before the fueling of the fuel tank, and the amount of remaining fuel, which is sensed with the remaining fuel amount sensing unit after the fueling of the fuel tank.

7. A fuel property sensing device for an internal combustion engine, comprising:

a fuel property sensing unit for sensing a fuel property of fuel based on a physical value, which is related to a combustion state of the fuel in the internal combustion engine;

a determining unit for determining whether a predetermined prerequisite operational condition for the sensing of the fuel property with the fuel property sensing unit is satisfied in the internal combustion engine;

a commanding, unit for commanding the sensing of the fuel property to the fuel property sensing unit when the determining unit determines that the predetermined prerequisite operational condition is satisfied upon each occurrence of traveling of a vehicle, which has the internal combustion engine, through a predetermined travel distance that serves as a parameter for determining a sensing frequency of the fuel property, which is sensed with the fuel property sensing unit;

a fueling sensing unit for sensing an occurrence of fueling of a fuel tank, which stores fuel supplied to the internal combustion engine, wherein the commanding unit commands the fuel property sensing unit to sense the fuel property when the determining unit determines that the predetermined prerequisite operational condition is satisfied upon each occurrence of the sensing of the fueling of the fuel tank with the fueling sensing unit, wherein the commanding unit commands the fuel property sensing unit to sense the fuel property when the determining unit determines that the predetermined prerequisite operational condition is satisfied upon consumption of a predetermined amount of fuel, which corresponds to a volume of a fuel supply system that supplies the fuel from the fuel tank to the internal combustion engine, after each occurrence of the sensing of the fueling of the fuel tank with the fueling sensing unit;

a remaining fuel amount sensing unit for sensing the amount of remaining fuel in the fuel tank; and a remaining fuel amount-based sensing frequency adjusting unit for adjusting the sensing frequency of the fuel property by adjusting the parameter based on the amount of remaining fuel, which is sensed with the remaining fuel amount sensing unit before the fueling of the fuel tank, and the amount of remaining fuel, which is sensed with the remaining fuel amount sensing unit after the fueling of the fuel tank, wherein the remaining fuel amount based sensing frequency adjusting unit increases the sensing frequency of the fuel property by adjusting the parameter when the amount of remaining fuel, which is sensed with the remaining fuel amount sensing unit before the fueling of the fuel tank, is generally the same as the amount of newly supplied fuel that is supplied to the fuel tank in the fueling of the fuel tank.

8. The fuel property sensing device according to claim 7, wherein:

the commanding unit commands the fuel property sensing unit to sense the fuel property when the determining unit determines that the predetermined prerequisite operational condition is satisfied upon each occurrence of execution of a predetermined number of operation cycle (s), each of which is from starting of the internal combustion engine to stopping of the internal combustion engine; and the predetermined number of the operation cycle(s) serves as a parameter for determining the sensing frequency of the fuel property, which is sensed with the fuel property sensing unit.

9. The fuel property sensing device according to claim 7, further comprising a fuel property sensing frequency adjusting unit for adjusting the sensing frequency of the fuel property by adjusting the parameter based on a difference between the fuel property, which is sensed with the fuel property sensing unit before the fueling, and the fuel property, which is sensed with the fuel property sensing unit after the fueling.

10. The fuel property sensing device according to claim 7, wherein:

the determining unit determines that the predetermined prerequisite operational condition is satisfied when an operational state of the internal combustion engine is a deceleration fuel cut-off state; and the fuel property sensing unit commands a fuel injection valve, which injects the fuel in the internal combustion engine, to execute a fuel injection, which is dedicated to the sensing of the fuel property, through the fuel injection valve upon the satisfying of the predetermined prerequisite operational condition, and the fuel property sensing unit senses the fuel property based on the physical value after the fuel injection, which is dedicated to the sensing of the fuel property.

11. The fuel property sensing device according to claim 7, wherein the amount of newly supplied fuel is determined based on a difference between the amount of remaining fuel, which is sensed with the remaining fuel amount sensing unit before the fueling of the fuel tank, and the amount of remaining fuel, which is sensed with the remaining fuel amount sensing unit after the fueling of the fuel tank.

12. A fuel property sensing device for an internal combustion engine, comprising:

a fuel property sensing unit for sensing a fuel property of fuel based on a physical value, which is related to a combustion state of the fuel in the internal combustion engine;

a determining unit for determining whether a predetermined prerequisite operational condition for the sensing of the fuel property with the fuel property sensing unit is satisfied in the internal combustion engine;

a commanding unit for commanding the sensing of the fuel property to the fuel property sensing unit when the determining unit determines that the predetermined prerequisite operational condition is satisfied upon each occurrence of execution of a predetermined number of operation cycle(s), each of which is from starting of the internal combustion engine to stopping of the internal combustion engine, wherein the predetermined number of the operation cycle(s) serves as a parameter for determining a sensing frequency of the fuel property, which is sensed with the fuel property sensing unit;

a fueling sensing unit for sensing an occurrence of fueling of a fuel tank, which stores fuel supplied to the internal combustion engine, wherein the commanding unit commands the fuel property sensing unit to sense the fuel property when the determining unit determines that the predetermined prerequisite operational condition is satisfied upon each occurrence of the sensing of the fueling of the fuel tank with the fueling sensing unit, wherein the commanding unit commands the fuel property sensing unit to sense the fuel property when the determining unit determines that the predetermined prerequisite operational condition is satisfied upon consumption of a predetermined amount of fuel, which corresponds to a volume of a fuel supply system that supplies the fuel from the fuel tank to the internal combustion engine, after each occurrence of the sensing of the fueling of the fuel tank with the fueling sensing unit;

a remaining fuel amount sensing unit for sensing the amount of remaining fuel in the fuel tank; and a remaining fuel amount-based sensing frequency adjusting unit for adjusting the sensing frequency of the fuel property by adjusting the parameter based on the amount of remaining fuel, which is sensed with the remaining fuel amount sensing unit before the fueling of the fuel tank, and the amount of remaining fuel, which is sensed with the remaining fuel amount sensing unit after the fueling of the fuel tank, wherein the remaining fuel amount based sensing frequency adjusting unit increases the sensing frequency of the fuel property by adjusting the parameter when the amount of remaining fuel, which is sensed with the remaining fuel amount sensing unit before the fueling of the fuel tank, is generally the same as the amount of newly supplied fuel that is supplied to the fuel tank in the fueling of the fuel tank.

13. The fuel property sensing device according to claim 12, further comprising a fuel property sensing frequency adjusting unit for adjusting the sensing frequency of the fuel property by adjusting the parameter based on a difference between the fuel property, which is sensed with the fuel property sensing unit before the fueling, and the fuel property, which is sensed with the fuel property sensing unit after the fueling.

14. The fuel property sensing device according to claim 12, wherein:

the determining unit determines that the predetermined prerequisite operational condition is satisfied when an operational state of the internal combustion engine is a deceleration fuel cut-off state; and the fuel property sensing unit commands a fuel injection valve, which injects the fuel in the internal combustion engine, to execute a fuel injection, which is dedicated to the sensing of the fuel property, through the fuel injection valve upon the satisfying of the predetermined prerequisite operational condition, and the fuel property sensing unit senses the fuel property based on the physical value after the fuel injection, which is dedicated to the sensing of the fuel property.

15. The fuel property sensing device according to claim 12, wherein the amount of newly supplied fuel is determined based on a difference between the amount of remaining fuel, which is sensed with the remaining fuel amount sensing unit before the fueling of the fuel tank, and the amount of remaining fuel, which is sensed with the remaining fuel amount sensing unit after the fueling of the fuel tank.

* * * * *